US012027030B2

(12) United States Patent
Shao et al.

(10) Patent No.: US 12,027,030 B2
(45) Date of Patent: Jul. 2, 2024

(54) METHODS AND SYSTEMS FOR GAS LEAKAGE SAFETY WARNING BASED ON INTERNET OF THINGS (IOT) OF SMART GAS

(71) Applicant: CHENGDU QINCHUAN IOT TECHNOLOGY CO., LTD., Sichuan (CN)

(72) Inventors: Zehua Shao, Chengdu (CN); Yong Li, Chengdu (CN); Yaqiang Quan, Chengdu (CN); Xiaojun Wei, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 0 days.

(21) Appl. No.: 18/468,735

(22) Filed: Sep. 17, 2023

(65) Prior Publication Data

US 2024/0005771 A1 Jan. 4, 2024

(30) Foreign Application Priority Data

Aug. 10, 2023 (CN) ......................... 202311002444.4

(51) Int. Cl.
*G08B 21/12* (2006.01)
*G08B 21/18* (2006.01)
(Continued)

(52) U.S. Cl.
CPC ........... *G08B 21/12* (2013.01); *G08B 21/182* (2013.01); *G16Y 10/35* (2020.01); *G16Y 40/50* (2020.01)

(58) Field of Classification Search
CPC ...... G08B 21/12; G08B 21/182; G08B 21/14; G08B 21/16; G16Y 10/35; G16Y 40/50
See application file for complete search history.

(56) References Cited

U.S. PATENT DOCUMENTS

| | | | | |
|---|---|---|---|---|
| 11,087,404 | B1 * | 8/2021 | Devereaux | G06Q 50/163 |
| 2013/0304385 | A1 * | 11/2013 | Gillette, II | F02F 7/0068 702/6 |

FOREIGN PATENT DOCUMENTS

| | | |
|---|---|---|
| CN | 107301757 A | 10/2017 |
| CN | 105045190 B | 12/2017 |

(Continued)

OTHER PUBLICATIONS

Jiang, Shichao, Gas Visual Monitoring and Alarm System Based on Internet of Things, Electronic Technology & Software Engineering, 2018, 3 pages.

(Continued)

*Primary Examiner* — Hongmin Fan
(74) *Attorney, Agent, or Firm* — METIS IP LLC

(57) ABSTRACT

The present disclosure provides a method and system for gas leakage safety warning based on Internet of Things (IoT) of smart gas. The method is implemented by a smart gas safety management platform of an IoT system for gas leakage safety warning. The method comprises obtaining gas data. The gas data at least includes gas operation data and gas concentration data. The method also includes determining a gas determination scenario through a preset determination algorithm based on the gas data, and determining a dynamic threshold set based on the gas data and the gas determination scenario. The dynamic threshold set includes a dynamic threshold of a gas concentration change of at least one time point. The method further includes determining gas leakage warning information of the at least one time point based on the gas data, the gas determination scenario, and the dynamic threshold set.

10 Claims, 4 Drawing Sheets

(51) Int. Cl.

| | |
|---|---|
| *G16Y 10/35* | (2020.01) |
| *G16Y 40/50* | (2020.01) |

(56) References Cited

FOREIGN PATENT DOCUMENTS

| | | | | |
|---|---|---|---|---|
| CN | 109146860 | * | 8/2018 | ............. G06T 7/136 |
| CN | 110782630 | A | 2/2020 | |
| CN | 113506430 | A | 10/2021 | |
| CN | 114416708 | * | 12/2021 | ............... G06N 5/01 |
| CN | 114251678 | A | 3/2022 | |
| CN | 116972344 | * | 5/2022 | |
| CN | 115539846 | * | 9/2022 | ............... G08B 7/06 |
| EP | 4145100 | * | 9/2021 | ............. H04R 1/406 |
| JP | 2007305114 | A | 11/2007 | |
| JP | 2008224281 | A | 9/2008 | |
| KR | 19980041363 | A | 8/1998 | |

OTHER PUBLICATIONS

Notification to Grant Patent Right for Invention in Chinese Application No. 202311002444.4 dated Sep. 19, 2023, 5 pages.

* cited by examiner

METHODS AND SYSTEMS FOR GAS LEAKAGE SAFETY WARNING BASED ON INTERNET OF THINGS (IOT) OF SMART GAS

CROSS-REFERENCE TO RELATED APPLICATIONS

This application claims priority to Chinese Patent Application No. 202311002444.4, filed on Aug. 10, 2023, the entire content of which is hereby incorporated by reference.

TECHNICAL FIELD

The present disclosure relates to the field of gas safety, and in particular, to a method and system for gas leakage safety warning based on Internet of Things (IoT) of smart gas.

BACKGROUND

Gas is used widely in production and daily life. However, the usage of gas also poses certain safety hazards, such as the risk of leakage. When gas leakages occurs, improper handling may result in poisoning, causing dizziness and breathing difficulties, or even explosions. Therefore, it is crucial to provide a method for an intelligent early warning of gas leakage.

In order to monitor and provide multi-level warnings for kitchen gas, and to enhance safety performance, CN105045190B provides a method and system for safety monitoring and warning of a working environment in a kitchen. The method comprises collecting a working status of a gas stove, transmitting the working status of the gas stove to a processing module, making an anomaly determination based on a predetermined logic, issuing an alarm at an appropriate level when a preset time is reached, and implementing emergency measures. However, the proposed method is relatively limited to an application scenario of the kitchen, which is unable to meet the needs of factory workshops, commercial districts, and other scenarios, thereby posing the risk of not being able to detect potential leakage hazards in time, and causing false alarms, misreporting, or unnecessary panic.

Therefore, it is desirable to provide a method and system for gas leakage safety warning based on IoT of smart gas, which can carry out gas leakage warning in a more timely and accurate manner.

SUMMARY

One or more embodiments of the present disclosure provide a method for gas leakage safety warning based on IoT of smart gas. The method may be implemented by a smart gas safety management platform of an IoT system for gas leakage safety warning. The method may comprise obtaining gas data. The gas data at least includes gas operation data and gas concentration data. The method may also comprise determining a gas determination scenario through a preset determination algorithm based on the gas data, and determining a dynamic threshold set based on the gas data and the gas determination scenario. The dynamic threshold set includes a dynamic threshold of a gas concentration change of at least one time point. The method may further comprise determining gas leakage warning information of the at least one time point based on the gas data, the gas determination scenario, and the dynamic threshold set.

One or more embodiments of the present disclosure provide an IoT system for gas leakage safety warning. The system may comprise a smart gas safety management platform configured to implement a method for gas leakage safety warning based on IoT of smart gas. The smart gas safety management platform may be configured to obtain gas data. The gas data may at least include gas operation data and gas concentration data. The smart gas safety management platform may also be configured to determine a gas determination scenario through a preset determination algorithm based on the gas data, and determine a dynamic threshold set based on the gas data and the gas determination scenario. The dynamic threshold set includes a dynamic threshold of a gas concentration change of at least one time point. The smart gas safety management platform may further be configured to determine gas leakage warning information of the at least one time point based on the gas data, the gas determination scenario, and the dynamic threshold set.

One or more embodiments of the present disclosure provide a non-transitory computer-readable storage medium, comprising executable instructions that, when executed by a computer, direct the computer to perform a method for gas leakage safety warning based on IoT of smart gas.

BRIEF DESCRIPTION OF THE DRAWINGS

The present disclosure will be further illustrated by way of exemplary embodiments, which will be described in detail with the accompanying drawings. These embodiments are non-limiting. In these embodiments the same count indicates the same structure, wherein.

DETAILED DESCRIPTION

Figure 1:
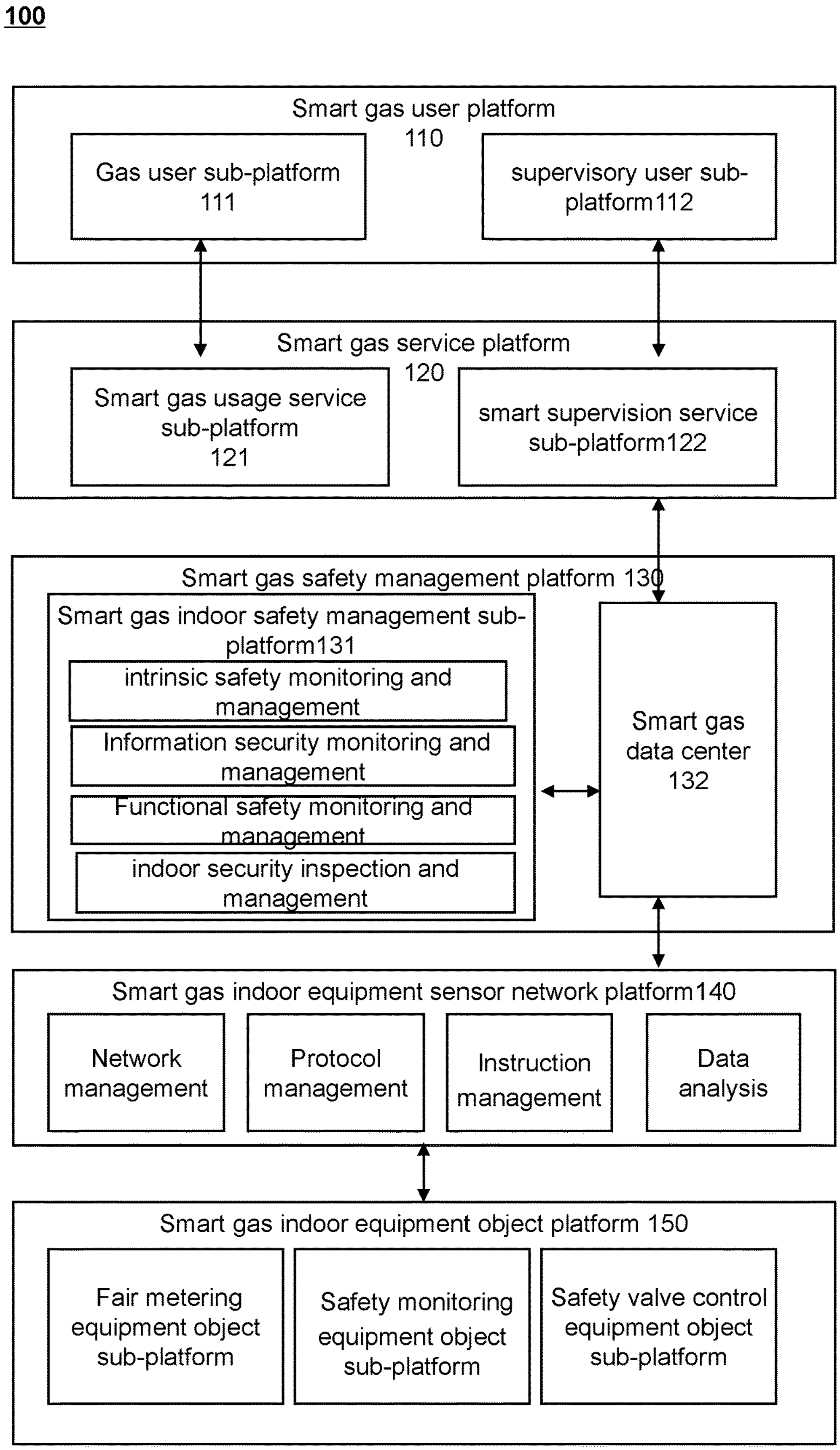
FIG. 1 is a diagram illustrating an exemplary platform architecture of an IoT system for gas leakage safety warning according to some embodiments of the present disclosure.

In order to more clearly illustrate the technical solutions of the embodiments of the present disclosure, the following briefly introduces the drawings that need to be used in the description of the embodiments. Apparently, the accompanying drawings in the following description are only some examples or embodiments of the present disclosure, and those skilled in the art can also apply the present disclosure to other similar scenarios according to the drawings without creative efforts. Unless obviously obtained from the context or the context illustrates otherwise, the same numeral in the drawings refers to the same structure or operation.

It should be understood that "system", "device", "unit" and/or "module" as used herein is a method for distinguishing different components, elements, parts, portions or assemblies of different levels. However, the words may be replaced by other expressions if other words can achieve the same purpose.

As indicated in the disclosure and claims, the terms "a", "an", "an" and/or "the" are not specific to the singular form and may include the plural form unless the context clearly indicates an exception. Generally speaking, the terms "comprising" and "including" only suggest the inclusion of clearly identified steps and elements, and these steps and elements do not constitute an exclusive list, and the method or device may also contain other steps or elements.

The flowchart is used in the present disclosure to illustrate the operations performed by the system according to the embodiments of the present disclosure. It should be understood that the preceding or following operations are not necessarily performed in the exact order. Instead, various steps may be processed in reverse order or simultaneously. Meanwhile, other operations may be added to these procedures, or a certain step or steps may be removed from these procedures.

FIG. 1 is a diagram illustrating an exemplary platform architecture of an IoT system for gas leakage safety warning according to some embodiments of the present disclosure. As shown in FIG. 1, the IoT system for gas leakage safety warning may include a smart gas user platform 110, a smart gas service platform 120, a smart gas safety management platform 130, a smart gas indoor equipment sensor network platform 140, and a smart gas indoor equipment object platform 150.

The smart gas user platform 110 may be a platform for interacting with a user. In some embodiments, the smart gas user platform 110 may be configured as a terminal device. In some embodiments, the smart gas user platform 110 may include a gas user sub-platform 111 and a supervisory user sub-platform 112. The gas user sub-platform 111 may be a platform that provides gas users with data related to gas usage and solutions to gas problems. The gas users may be industrial gas users, commercial gas users, general gas users, or the like. The supervisory user sub-platform 112 may be a platform for supervising the operation of the entire IoT system. Supervisory users may be personnel from safety management departments. In some embodiments, the smart gas user platform 110 may send information such as a gas leakage warning to the gas users based on the gas user sub-platform 111.

The smart gas service platform 120 may be a platform for delivering the user's demand and control information. The smart gas service platform 120 may obtain gas leakage warning information, or the like, from the smart gas safety management platform 130 (e.g., a smart gas data center) and send the gas leakage warning information to the smart gas user platform 110. In some embodiments, the smart gas service platform 120 may include a smart gas usage service sub-platform 121 and a smart supervision service sub-platform 122. The smart gas usage service sub-platform 121 may be a platform that provides gas services to the gas users. The smart supervision service sub-platform 122 may be a platform that fulfills supervisory needs of the supervisory users. In some embodiments, the smart gas service platform 120 may send the gas leakage warning information to the gas user sub-platform 111 based on the smart gas usage service sub-platform 121.

The smart gas service platform 130 may be a platform that provides perception management and control management functions for the IoT operation system, which is used to coordinate and harmonize the connection and collaboration between the functional platforms and converge all the information of the IoT. In some embodiments, the smart gas service platform 130 may include a smart gas indoor safety management sub-platform 131 and a smart gas data center 132. The smart gas indoor safety management sub-platform 131 may be a platform for determining the gas leakage warning information and transmitting the gas leakage warning information to the smart gas data center 132. In some embodiments, the smart gas indoor safety management sub-platform 131 may include, but is not limited to, an intrinsic safety monitoring and management module, an information security monitoring and management module, a functional safety monitoring and management module, and an indoor security inspection and management module. The smart gas indoor safety management sub-platform may analyze and process gas data through the aforementioned management modules. The smart gas data center 132 may be configured to store and manage all operation information of the IoT system 100 for gas leakage safety warning. In some embodiments, the smart gas data center 132 may be configured as a storage device for storing, among other things, data related to gas. In some embodiments, the smart gas service management platform 130 may perform information interaction with the smart gas service platform 120 and the smart gas indoor equipment sensor network platform 140 via the smart gas data center 132, respectively. For example, the smart gas data center 132 may send gas leakage warning information to the smart gas service platform 120. As another example, the smart gas data center 132 may send an instruction for obtaining the gas data to the smart gas indoor equipment sensor network platform 140 to obtain the gas data.

The smart gas indoor equipment sensor network platform 140 may be a functional platform for managing sensing communication. In some embodiments, the smart gas indoor equipment sensor network platform 140 may perform the functions of sensing communication of perception information and sensing communication of control information. In some embodiments, the smart gas indoor equipment sensor network platform 140 may include network management, protocol management, instruction management, and data analysis.

The smart gas indoor equipment object platform 150 may be a functional platform for generating the perception information and executing the control information. For example, the smart gas indoor equipment object platform 150 may monitor indoor equipment and generate the gas data. In some embodiments, the smart gas indoor equipment object platform 150 may include a fair metering equipment object sub-platform, a safety monitoring equipment object sub-platform, and a safety valve control equipment object sub-platform.

Figure 2:
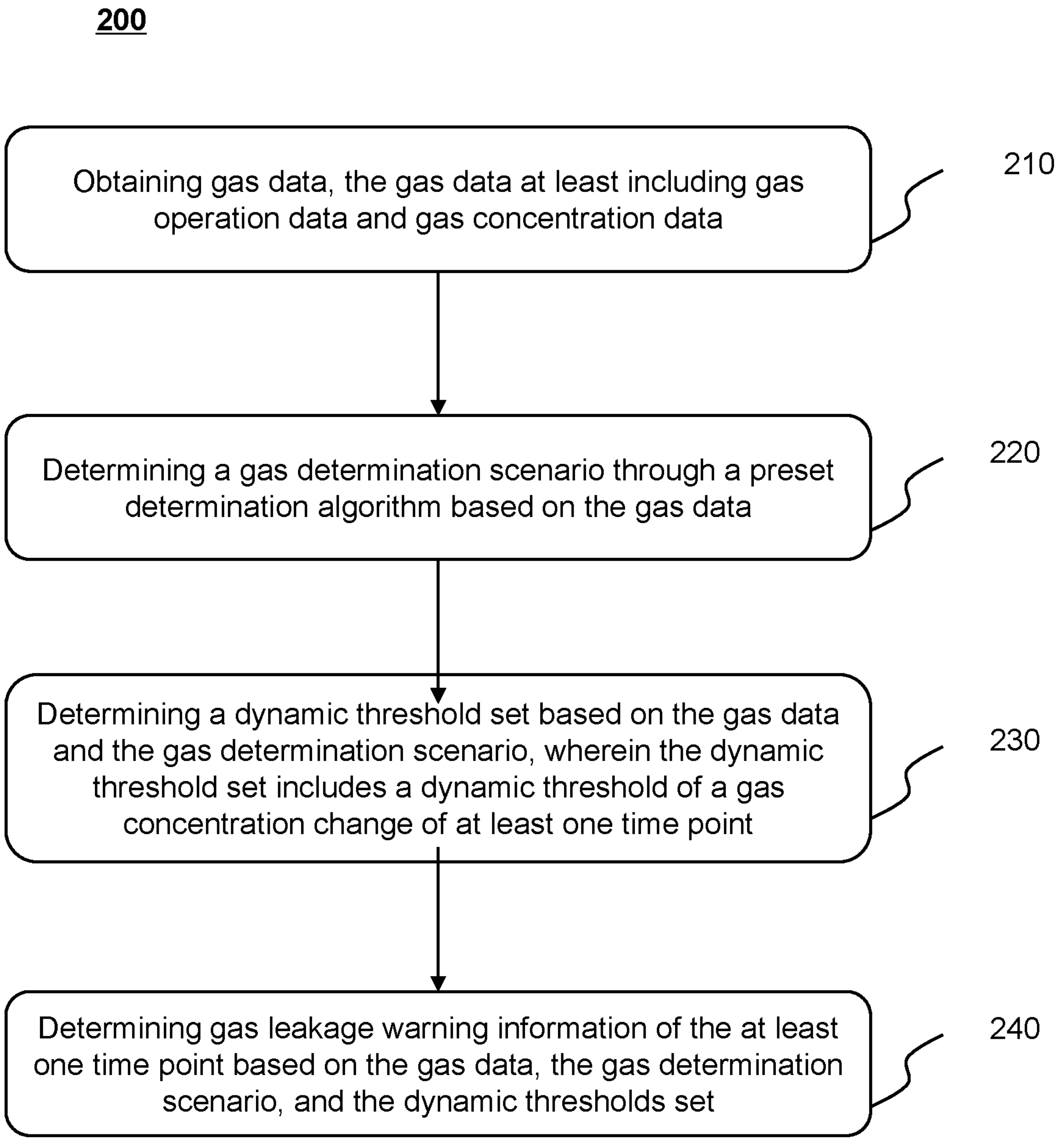
FIG. 2 is a flowchart illustrating an exemplary method for gas leakage safety warning based on IoT of smart gas according to some embodiments of the present disclosure.

FIG. 2 is a flowchart illustrating an exemplary method for gas leakage safety warning based on IoT of smart gas according to some embodiments of the present disclosure. In some embodiments, a process 200 may be performed by the smart gas safety management platform 130. As shown in FIG. 2, the process 200 may include the following operations.

In 210, gas data may be obtained.

The gas data refers to data related to gas usage in a gas system. The gas data at least includes gas operation data and gas concentration data. The gas operation data refers to data related to recording operations performed on gas, such as turning off gas valve, turning on gas valve, and recording gas usage. The gas concentration data refers to a percentage of gas in the air. The gas data may further include other relevant data. More details regarding the gas data may be found in FIGS. 3 and 4 and related descriptions thereof.

In some embodiments, the smart gas safety management platform 130 may obtain gas data in a plurality of dimensions, such as obtaining gas data of at least one time point/period, obtaining gas data of at least one space, or the like.

In some embodiments, the gas data may be obtained by the smart gas safety management platform 130 via the smart gas indoor equipment object platform 150.

In 220, a gas determination scenario may be determined through a preset determination algorithm based on the gas data.

The gas determination scenario refers to a specific scenario used for gas leakage determination. In some embodiments, the gas determination scenario may include a first determination scenario and a second determination scenario. The first determination scenario refers to a scenario in which a user is performing ignition, and the second determination scenario refers to a scenario in which the user is performing gas operation.

In some embodiments, the gas determination scenario may be determined through the preset determination algorithm based on the gas data.

The preset determination algorithm refers to a computational method for deriving a corresponding gas determination scenario based on the gas data.

For example, the smart gas service platform 120 may determine the gas determination scenario based on the gas operation data and gas concentration data of the gas data in combination with historical gas data and historical scenario information corresponding to the historical gas data. The historical scenario information refers to determination scenarios corresponding to the historical gas data. The smart gas service platform 120 may obtain at least one historical gas data closest to current gas data and at least one historical scenario information corresponding to the at least one historical gas data, perform statistics on an occurrence frequency of each historical scenario information, and determine the historical scenario information with a highest occurrence frequency as the gas determination scenario corresponding to the current gas data.

In some embodiments, the preset determination algorithm may include a first preset condition and a second preset condition. More descriptions regarding the determination algorithm, the first preset condition, and the second preset condition may be found in FIGS. 3 and 4 and related descriptions thereof.

In 230, a dynamic threshold set may be determined based on the gas data and the gas determination scenario.

The dynamic threshold set refers to a threshold set configured to determine whether a gas leakage potential hazard exists. In some embodiments, the dynamic threshold set may include at least one of a concentration threshold, a concentration change slope threshold, and a time threshold, or include another threshold configured to determine whether the gas leakage potential hazard exists, which may be set based on actual needs. The concentration threshold represents a maximum gas concentration within a safety range, and the gas concentration is a detection value of a gas concentration detection device. A gas concentration change over time may be presented in a form of a graph. A slope of a gas concentration change curve represents a change rate of the gas concentration over time. The concentration change slope threshold represents a maximum slope within a safety range. The time threshold represents a maximum acceptable time within a safety range for unmanned operation of the indoor gas equipment.

In some embodiments, the smart gas safety management platform 130 may determine at least one dynamic threshold set based on different temporal and spatial information.

In some embodiments, the dynamic threshold set may be determined by the smart gas safety management platform 130 based on a predetermined rule. For example, the dynamic threshold set may be determined based on a previous experience or historical data.

In some embodiments, the dynamic threshold set may also be determined based on different gas determination scenarios. More detailed descriptions may be found in FIGS. 3 and 4 and related descriptions thereof in the present disclosure.

In 240, gas leakage warning information of at least one time point may be determined based on the gas data, the gas determination scenario, and the dynamic threshold set.

The gas leakage warning information refers to whether a gas leakage warning is activated.

In some embodiments, the smart gas service platform 120 may send the gas leakage warning information of the at least one time point to the smart gas indoor equipment object platform 150, so that the smart gas indoor equipment object platform 150 may display the gas leakage warning information of the at least one time point.

In some embodiments, the gas leakage warning information may be determined by comparing the gas data with the dynamic threshold set under different gas determination scenarios. For example, the gas concentration, the gas concentration change curve, and the time at which the user operates the gas may be determined based on the user operation data and the gas concentration data of the gas data, and the data may then be compared with the concentration threshold, the concentration change slope threshold, and the time threshold in the dynamic threshold set. When one or more data exceed a threshold range of the dynamic threshold set, the gas leakage warning information may be generated.

Figure 3:
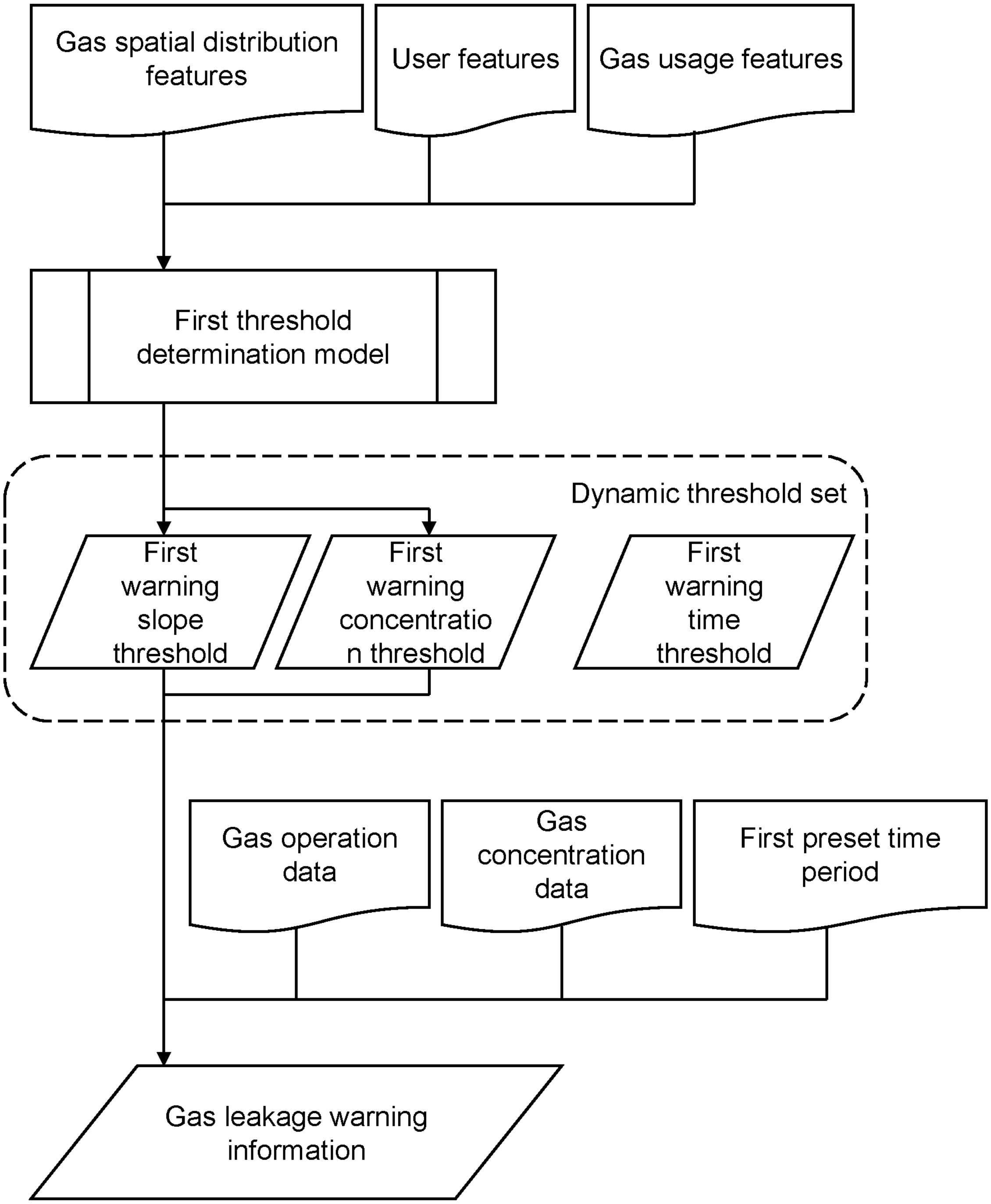
FIG. 3 is a schematic diagram illustrating an early warning in a first determination scenario according to some embodiments of the present disclosure.
Figure 4:
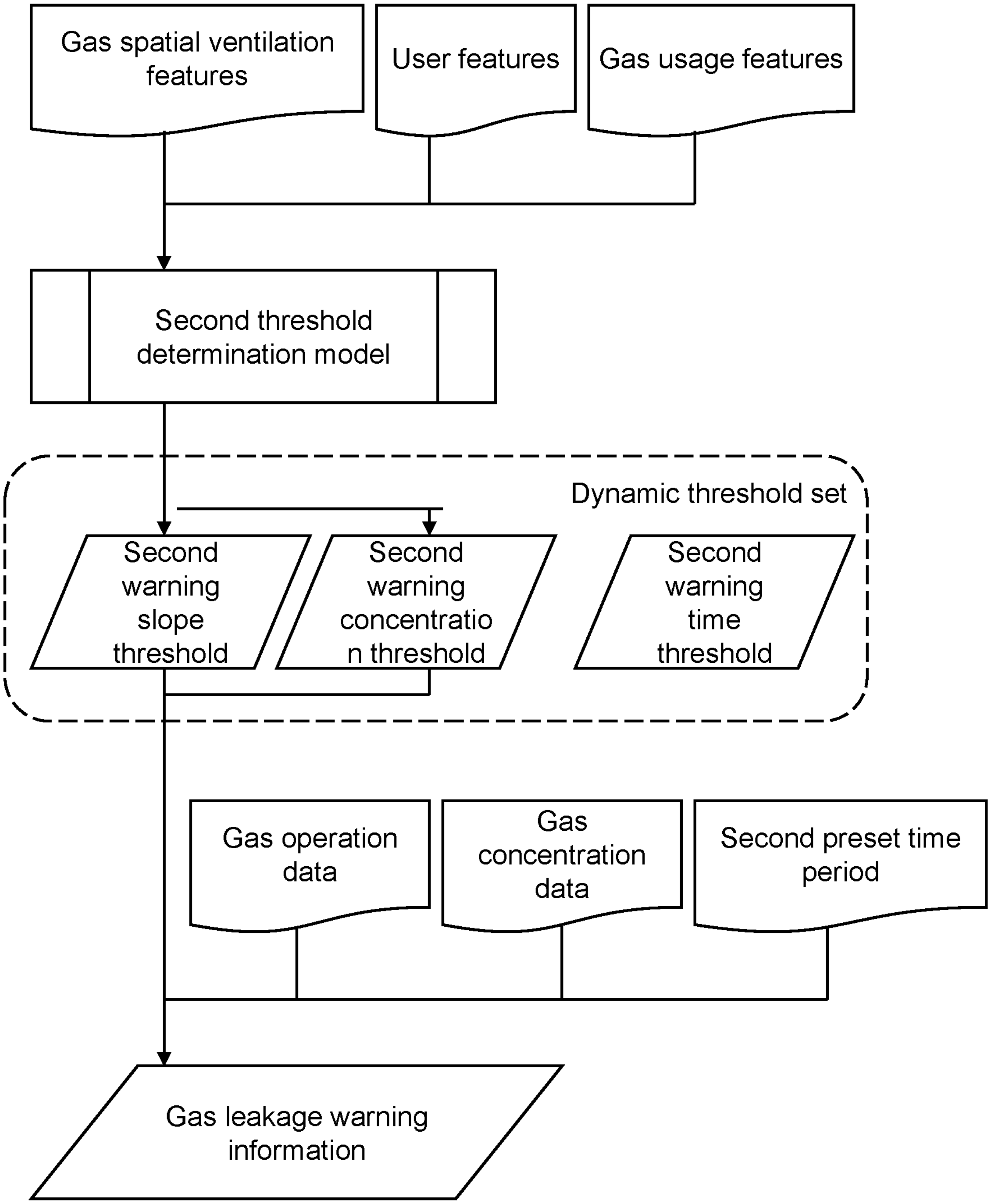
FIG. 4 is a schematic diagram illustrating an early warning in a second determination scenario according to some embodiments of the present disclosure.

More descriptions regarding determining the gas leakage warning information may be found in FIGS. 3 and 4 and related descriptions thereof in the present disclosure.

In some embodiments of the present disclosure, by determining the gas determination scenario and the dynamic threshold set, and determining the warning information based on the gas determination scenario and the dynamic threshold set, corresponding warning thresholds may be applied for different scenarios, so that false alarms caused by mismatches between the thresholds and the scenarios are significantly reduced, thereby improving the efficiency and relevance of the user's response to early warnings for dealing with gas leakage.

It should be noted that the foregoing description of the processes involved is intended to be exemplary and illustrative only and does not limit the scope of application of the present disclosure. For those skilled in the art, various corrections and changes to the process may be made under the guidance of the present disclosure. However, these amendments and changes remain within the scope of the present disclosure.

FIG. 3 is a schematic diagram illustrating a determination of gas leakage warning information in a first determination scenario according to some embodiments of the present disclosure.

In some embodiments, in response to a determining that the gas data satisfies a first preset condition, the smart gas safety management platform 130 may determine the gas determination scenario as a first determination scenario.

The first preset condition may include operation features and data features representing that the user is performing ignition. For example, the first preset condition may include monitoring data of a gas meter indicating that a state of a gas valve changes from a turned off state to a turned on state, i.e., an operation feature reflecting a gas valve change during ignition. As another example, the first preset condition may include a gas concentration increasing from zero or increasing instantaneously, i.e., a data feature reflecting gas concentration change during ignition. The first preset condition may be pre-set based on prior knowledge.

In some embodiments, the first determination scenario refers to a scenario in which the user is performing ignition.

In some embodiments of the present disclosure, in response to a determining that the gas data satisfies the first preset condition, the gas determination scenario may be determined as the first determination scenario, thereby facilitating subsequent threshold determination for the scenario, and making early warning analysis more targeted.

In some embodiments, the gas data may further include gas scenario data, and the gas scenario data may include gas spatial distribution features.

In some embodiments, the smart gas safety management platform 130 may determine a first warning slope threshold and a first warning concentration threshold based on the gas spatial distribution features, and in response to a determining that the gas determination scenario is the first determination scenario, determine the dynamic threshold set based on the first warning slope threshold and the first warning concentration threshold.

The gas scenario data refers to data related to a gas usage scenario. The gas scenario data may be obtained based on measurement of the gas usage scenario. The gas scenario data may include the gas spatial distribution features.

The gas spatial distribution features refer to distribution features of indoor spatial gas equipment and gas concentration. The gas spatial distribution features may include a relative positional relationship between a gas stove and a detection device, a gas concentration $S_0$ at the gas stove, and a gas concentration $S_1$ at the detection device. The relative positional relationship between the gas stove and the detection device may include a distance $D_1$, a height difference $L_1$, or the like.

In some embodiments, the gas scenario data may further include other relevant data. More descriptions regarding the gas scenario data may be found in FIG. 4 and related descriptions thereof in the present disclosure.

In some embodiments, the dynamic threshold set may include the first warning slope threshold and the first warning concentration threshold. For different spaces, different first warning slope thresholds and first warning concentration thresholds may be set based on first spatial parameters ($D_1$, $L_1$) of different spaces.

The gas concentration change over time may be presented in the form of a graph, and a slope of the gas concentration change curve may represent a change rate of the gas concentration over time. The first warning slope threshold refers to a maximum value of the slope of the gas concentration change curve within the safety range under the first determination scenario. If the gas concentration change curve exceeds the first warning slope threshold, the gas leakage warning may be issued.

The first warning concentration threshold refers to a maximum value of the gas concentration within the safety range under the first determination scenario. If a detected gas concentration exceeds the first warning concentration threshold, the gas leakage warning may be issued.

A gas concentration detected by the detection device may be negatively correlated with the distance and the height difference between the detection device and the gas stove, and positively correlated with a gas concentration released at the gas stove.

In some embodiments, the smart gas safety management platform 130 may determine the first warning slope value and the first warning concentration value by querying a first threshold reference table. The first threshold reference table, which may be determined based on prior knowledge or historical data, may include at least one historical gas spatial distribution feature and a first reference warning slope threshold and a first reference warning concentration threshold value corresponding to the at least one historical gas spatial distribution feature. The smart gas safety management platform 130 may determine the first warning slope threshold and the first warning concentration threshold by looking up the first threshold reference table based on the current gas spatial distribution features.

In some embodiments of the present disclosure, the gas data may be analyzed from a plurality of dimensions, and the dynamic threshold set adapted to different spaces may be set, thereby making gas data detection results more reliable in the scenario where the user is performing ignition, and improving the safety of gas usage.

In some embodiments, the smart gas safety management platform 130 may determine the first warning slope threshold and the first warning concentration threshold through a first threshold determination model based on the gas spatial distribution features.

The first threshold determination model may be a machine learning model, such as a Deep Neural Networks (DNN) model, a Convolutional Neural Networks (CNN) model, or the like, or any combination thereof.

In some embodiments, an input of the first threshold determination model may include the gas spatial distribution features, user features, and gas usage features, and an output of the first threshold determination model may include the first warning slope threshold and the first warning concentration threshold.

The user features may include user age and user's time at home. The user age may be obtained through the smart gas user platform 110. The user's time at home may be obtained through a monitor near the gas usage scenario of the user.

The gas usage features may include a frequency of gas usage and an average time per gas usage. The gas usage features may be obtained through the smart gas indoor equipment object platform 150.

In some embodiments, the first threshold determination model may be obtained by training first training samples with first labels.

In some embodiments, the first training samples may include sample gas spatial distribution features, sample user features, and sample gas usage features, and the first labels may be sample thresholds corresponding to the first training samples. The sample thresholds may include a sample first warning concentration threshold and a sample first warning slope threshold. The sample thresholds refer to thresholds determined based on a large amount of historical data, user feedback after early warning, etc., which increase the success rate of early warning, reduce the error rate of early warning, and reduce safety accidents for a scenario corresponding to a certain sample data.

The first training samples and the first labels may be obtained by historical data analysis.

In some embodiments of the present disclosure, the gas spatial distribution features, the user features, and the gas usage features may be processed by the first threshold determination model. The correlation relationship between the first warning slope threshold and the first warning concentration threshold and the gas spatial distribution features may be obtained by finding patterns from a large amount of historical gas usage data based on the self-learning capability of the machine learning model, thereby improving the accuracy and the efficiency of determining the first warning slope threshold and the first warning concentration threshold.

In some embodiments, in response to a determining that the gas determination scenario is the first determination scenario, the smart gas safety management platform 130 may determine the gas leakage warning information of at least one time point by comparing the gas concentration data of the at least one time point with the first warning slope threshold and the first warning concentration threshold.

For example, when the slope of the gas concentration change curve of a time point exceeds the first warning slope threshold, and/or the gas concentration data of the time point exceeds the first warning concentration threshold, the smart gas safety management platform 130 may determine gas leakage of the time point and issue a warning.

In some embodiments, the smart gas safety management platform 130 may determine the gas leakage warning information based on the gas concentration and the gas concentration change during a first preset time period.

For example, the gas leakage warning may be activated when a gas concentration of any time point during the first preset time period is greater than the first warning concentration threshold. As another example, the gas leakage warning may be activated when a slope of a gas concentration change of any time point during the first preset time period is greater than the first warning slope threshold.

The first preset time period refers to a preset time period before and after the ignition operation of the user. The first preset time period may be set based on prior experience. For example, the first preset time period may be five seconds before the ignition operation or ten seconds after the ignition operation.

In some embodiments of the present disclosure, the gas leakage warning information may be determined based on the gas concentration and the gas concentration change during the first preset time period, so that the possibility of gas leakage may be detected in time, and the risk of accidents may be reduced.

In some embodiments, the dynamic threshold set may further include a first warning time threshold.

The first warning time threshold refers to a warning threshold for determining gas leakage in the event of ignition failure. If ignition fails and re-ignition time is greater than the first warning time threshold, the gas leakage warning may be activated. More descriptions regarding the gas leakage warning information may be found in FIG. 2 and related descriptions thereof.

In some embodiments, the smart gas safety management platform 130 may determine the ignition failure by combining the operation features and data features. For example, if the monitoring data of the gas meter indicates that the state of the gas valve changes from a turned off state to a turned on state and the final state of the gas valve is kept in the turned on state, but the slope of the gas concentration change is greater than the first warning slope threshold or the gas concentration is greater than the first warning concentration threshold, it may represent that the gas valve is turned on and the gas is combusted abnormally. If a difference between the slope of the gas concentration change and the first warning slope threshold is greater than a reference slope difference, or a difference between the gas concentration and the first warning concentration threshold is greater than a reference concentration difference, it may represent that the gas is not combusted and the ignition fails. If the difference between the slope of the gas concentration change and the first warning slope threshold is less than the reference slope difference, or the difference between the gas concentration and the first warning concentration threshold is less than the reference concentration difference, it may represent that the ignition is successful but the gas is not fully combusted.

In some embodiments of the present disclosure, the dynamic threshold set may include the first warning time threshold, which considers scenarios where the gas leakage occurs due to ignition failure or incomplete combustion of the gas, so that the conditions requiring a warning may be further determined from the perspective of hidden dangers, thereby comprehensively improving the safety of gas usage.

In some embodiments of the present disclosure, the gas leakage warning information of the at least one time point may be determined by comparing the gas concentration data of the at least one time point with the first warning slope threshold and the first warning concentration threshold. The risk of gas leakage may be determined in combination with various data, thereby improving the accuracy and the reliability of the warning FIG. 4 is a schematic diagram illustrating an early warning in a second determination scenario according to some embodiments of the present disclosure.

In some embodiments, in response to a determining that the gas data satisfies a second preset condition, the smart gas safety management platform 130 may determine the gas determination scenario as a second determination scenario.

The second preset condition may include operation features and data features of gas operation performed by the user. For example, the second preset condition may include monitoring data of the gas meter indicating continuous turned on state of the gas valve. As another example, the second preset condition may include that the gas concentration remains steady, the gas concentration gradually increases, or the gas concentration rapidly increases at some time points.

The second determination scenario refers to a scenario in which the user performs the gas operation. The gas operation may include cooking, boiling water, and other scenarios of gas usage.

In some embodiments of the present disclosure, in response to a determining that the gas data satisfies the second preset condition, the gas determination scenario may be determined as the second determination scenario, thereby facilitating subsequent determination of the threshold corresponding the scenario, and making the early warning analysis more targeted.

In some embodiments, the gas data may further include gas scenario data, and the gas scenario data may include gas spatial ventilation features.

In some embodiments, the smart gas safety management platform 130 may determine a second warning slope threshold and a second warning concentration threshold based on the gas spatial ventilation features. In response to a determining that the gas determination scenario is the second determination scenario, a dynamic threshold set may be determined based on the second warning slope threshold and the second warning concentration threshold.

The gas spatial ventilation features refer to features related to ventilation in a space where indoor gas equipment is located. The gas spatial ventilation features may include a distance $D_1$ between a gas concentration detection device and a gas stove, a distance $D_2$ between the gas concentration detection device and a vent, a distance $D_3$ between the gas stove and the vent, a volume V of a gas space (e.g., a kitchen), and an area S of the vent (e.g., a window).

In some embodiments, the smart gas user platform 130 may obtain data uploaded by the user. The uploaded data may include data related to the gas spatial ventilation features, such as an installation position of the gas cooker, an installation position of the gas concentration detection device, a position of the vent, a size of the gas space, a size of the vent, or the like. The smart gas safety management platform 130 may obtain data related to the gas spatial ventilation features through the smart gas service platform 120, and determine the gas spatial ventilation features based on the uploaded data.

In some embodiments, the dynamic threshold set may further include the second warning slope threshold and the second warning concentration threshold. For different spaces, different second warning slope thresholds and second warning concentration thresholds may be set based on second spatial parameters (e.g., $D_1$, $D_2$, $D_3$, V, and S) of different spaces.

The second warning slope threshold refers to a maximum value of the slope of the gas concentration change curve within the safety range under the second determination scenario. If the slope of the gas concentration change curve is greater than the second warning slope threshold, the gas leakage warning may be issued.

The second warning concentration threshold refers to a maximum value of the gas concentration within the safety range under the second determination scenario. If the gas concentration is greater than the second warning concentration threshold, the gas leakage warning may be issued.

In some embodiments, the smart gas safety management platform 130 may determine the second warning slope value and the second warning concentration value by querying a second threshold reference table. The second threshold reference table may be determined based on prior knowledge or historical data. The second threshold reference table may include at least one historical gas spatial ventilation feature and a second reference warning slope threshold and a second reference warning concentration threshold corresponding to the at least one historical gas spatial ventilation feature. The smart gas safety management platform 130 may determine the second warning slope threshold and the second warning concentration threshold by looking up the second threshold reference table based on current gas spatial ventilation features.

In some embodiments of the present disclosure, the gas data may be analyzed from a plurality of dimensions, and the dynamic threshold set adapted to different spaces may be set, thereby making gas data detection results more reliable in the scenario where the user performs the gas operation, and improving the safety of gas usage.

In some embodiments, the smart gas safety management platform 130 may determine the second warning slope threshold and the second warning concentration threshold through a second threshold determination model based on the gas spatial ventilation features.

The second threshold determination model may be a machine learning model, such as a Deep Neural Networks (DNN) model, a Convolutional Neural Networks (CNN) model, or the like, or any combination thereof.

In some embodiments, an input of the second threshold determination model may include the gas spatial ventilation features, user features, and gas usage features, and an output of the second threshold determination model may include the second warning slope threshold and the second warning concentration threshold. More descriptions regarding the user features and the gas usage features may be found in FIG. 3 and related descriptions thereof.

In some embodiments, the second threshold determination model may be obtained by training second training samples with second labels.

In some embodiments, the second training samples may include sample gas spatial ventilation features, sample user features, and sample gas usage features, and the second labels may be sample thresholds corresponding to the second training samples. The sample thresholds may include a sample second warning concentration threshold and a sample second warning slope threshold. More descriptions regarding the sample thresholds may be found in FIG. 3 and related descriptions thereof.

The second training samples and the second labels may be obtained by historical data analysis.

In some embodiments of the present disclosure, the gas spatial ventilation features, the user features, and the gas usage features may be processed by the second threshold determination model. The correlation relationship between the second warning slope threshold and the second warning concentration threshold and the gas spatial distribution features may be obtained by finding patterns from a large amount of historical gas usage data based on the self-learning capability of the machine learning model, thereby improving the accuracy and the efficiency of determining the second warning slope threshold and the second warning concentration threshold.

In some embodiments, in response to a determining that the gas determination scenario is the second determination scenario, the smart gas safety management platform 130 may determine the gas leakage warning information of the at least one time point by comparing the gas concentration data of the at least one time point with the second warning slope threshold and the second warning concentration threshold.

For example, in the second determination scenario, when the slope of the gas concentration change curve of a time point exceeds the second warning slope threshold, and/or the gas concentration data of the time point exceeds the second warning concentration threshold, the smart gas safety management platform 130 may determine gas leakage of the time point, and issue a warning.

In some embodiments, the smart gas safety management platform 130 may continuously perform the statistics on the gas concentration and the concentration change during a second preset time period.

The second preset time period refers to a latest time period of gas usage. The second preset time period may change in real time as time goes by. For example, the second preset time period refers to last 5 s of a current time point, and the second preset time period changes in real time (e.g., every 1 s) as the current time point changes or goes by.

In some embodiments, the smart gas safety management platform 130 may determine the gas leakage warning information based on the gas concentration and the gas concentration change during the second preset time period.

For example, if the gas concentration of any time within the second preset time period is less than the second warning concentration threshold, and the slope of the gas concentration change within any time sub-interval of the second preset time period is less than the second warning slope threshold, it may represent that the user is performing normal gas operation, and the gas leakage warning may not be activated.

Since the second preset time period changes in real time, a plurality of consecutive second preset time periods may be generated over time. For example, the second preset time period corresponding to a current time $t_1$ may be denoted as $T_1$ ($t_1$−5 s, $t_1$), which represents that the second preset time period does not extend from 5 s before the current time $t_1$ to the current time $t_1$. As time goes by and the current time becomes t2, the second preset time period corresponding to $t_2$ may be denoted as $T_2$ ($t_2$−5 s, $t_2$). If $t_2$ (i.e., $t_2=t_1+1$ s) is the next second after $t_1$, the second preset time period corresponding to $t_2$ may also be denoted as $T_2$ ($t_1$−4 s, $t_1$+1).

If there is any time when the gas concentration exceeds the second warning concentration threshold and/or the slope of the gas concentration change in any time sub-interval is greater than the second warning slope threshold in the plurality of consecutive second preset time periods, it may represent the possibility of insufficient combustion and gas leakage, and the gas leakage warning may be activated.

If there is an abnormal second preset time period among the plurality of consecutive second preset time periods, and there is a time point within the abnormal second preset time period that the slope of the gas concentration change for any subsequent time period is greater than the second warning slope threshold, it may represent the possibility of malfunction in gas combustion during the time period or an unexpected situation (e.g., the fire is extinguished by overflowing water while boiling water), and the gas leakage warning may be activated.

In some embodiments of the present disclosure, statistics may be continuously performed on the gas concentration and the gas concentration change during the second preset time period, so that the possibility of gas leakage may be detected in time, and the risk of accidents may be reduced.

In some embodiments, the dynamic threshold set may further include a second warning time threshold.

The second warning time threshold refers to a maximum duration within the safety range during which the user does not perform any operation. If gas usage time exceeds the second warning time threshold, the gas leakage warning may be activated. The gas usage time may be obtained based on a gas monitoring device of a safety monitoring device object sub-platform.

In some embodiments, the second warning time threshold may be set based on prior experience or practical needs.

In some embodiments of the present disclosure, the dynamic threshold set may further include the second warning time threshold, which considers the scenario where the gas leakage occurs when the user leaves the fire on, so that the conditions requiring a warning may be further determined from the perspective of hidden dangers, thereby comprehensively improving the safety of gas usage.

In some embodiments of the present disclosure, the gas leakage warning information of the at least one time point may be determined by comparing the gas concentration data of the at least one time point with the second warning slope threshold and the second warning concentration threshold. The risk of gas leakage may be determined in combination with various data, thereby improving the accuracy and the reliability of the warning.

Some embodiments of the present disclosure provide a non-transitory computer-readable storage medium, comprising computer instructions that, when read by a computer, direct the computer to perform a method for gas leakage safety warning based on IoT of smart gas.

The basic concept has been described above. Obviously, for those skilled in the art, the above detailed disclosure is only an example, and does not constitute a limitation to the present disclosure. Although not expressly stated here, those skilled in the art may make various modifications, improvements and corrections to the present disclosure. Such modifications, improvements and corrections are suggested in this disclosure, so such modifications, improvements and corrections still belong to the spirit and scope of the exemplary embodiments of the present disclosure.

Meanwhile, the present disclosure uses specific words to describe the embodiments of the present disclosure. For example, "one embodiment", "an embodiment", and/or "some embodiments" refer to a certain feature, structure or characteristic related to at least one embodiment of the present disclosure. Therefore, it should be emphasized and noted that references to "one embodiment" or "an embodiment" or "an alternative embodiment" two or more times in different places in the present disclosure do not necessarily refer to the same embodiment. In addition, certain features, structures or characteristics in one or more embodiments of the present disclosure may be properly combined.

In addition, unless clearly stated in the claims, the sequence of processing elements and sequences described in the present disclosure, the use of counts and letters, or the use of other names are not used to limit the sequence of processes and methods in the present disclosure. While the foregoing disclosure has discussed by way of various examples some embodiments of the invention that are presently believed to be useful, it should be understood that such detail is for illustrative purposes only and that the appended claims are not limited to the disclosed embodiments, but rather, the claims are intended to cover all modifications and equivalent combinations that fall within the spirit and scope of the embodiments of the present disclosure. For example, although the implementation of various components described above may be embodied in a hardware device, it may also be implemented as a software only solution, e.g., an installation on an existing server or mobile device.

In the same way, it should be noted that in order to simplify the expression disclosed in this disclosure and help the understanding of one or more embodiments of the invention, in the foregoing description of the embodiments of the present disclosure, sometimes multiple features are combined into one embodiment, drawings or descriptions thereof. This method of disclosure does not, however, imply that the subject matter of the disclosure requires more features than are recited in the claims. Rather, claimed subject matter may lie in less than all features of a single foregoing disclosed embodiment.

In some embodiments, counts describing the quantity of components and attributes are used. It should be understood that such counts used in the description of the embodiments use the modifiers "about", "approximately" or "substantially" in some examples. Unless otherwise stated, "about", "approximately" or "substantially" indicates that the stated figure allows for a variation of ±20%. Accordingly, in some embodiments, the numerical parameters used in the disclosure and claims are approximations that can vary depending upon the desired characteristics of individual embodiments. In some embodiments, numerical parameters should consider the specified significant digits and adopt the general digit retention method. Although the numerical ranges and parameters used in some embodiments of the present disclosure to confirm the breadth of the range are approximations, in specific embodiments, such numerical values are set as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A method for gas leakage safety warning based on Internet of Things (IoT) of smart gas, implemented by a smart gas safety management platform of an IoT system for gas leakage safety warning, comprising:

obtaining gas data, the gas data at least including gas operation data and gas concentration data;

determining a gas determination scenario through a preset determination algorithm based on the gas data;

determining a dynamic threshold set based on the gas data and the gas determination scenario, wherein the dynamic threshold set includes a dynamic threshold of a gas concentration change of at least one time point; and determining gas leakage warning information of the at least one time point based on the gas data, the gas determination scenario, and the dynamic threshold set.

2. The method of claim 1, wherein the determining a gas determination scenario through a preset determination algorithm based on the gas data includes:

in response to a determining that the gas data satisfies a first preset condition, determining the gas determination scenario as a first determination scenario.

3. The method of claim 2, wherein the gas data further includes gas scenario data, the gas scenario data includes gas spatial distribution features, and the determining a dynamic threshold set based on the gas data and the gas determination scenario includes:

determining a first warning slope threshold and a first warning concentration threshold based on the gas spatial distribution features; and in response to a determining that the gas determination scenario is the first determination scenario, determining the dynamic threshold set based on the first warning slope threshold and the first warning concentration threshold.

4. The method of claim 3, wherein the determining gas leakage warning information of the at least one time point based on the gas data, the gas determination scenario, and the dynamic threshold set includes:

in response to a determining that the gas determination scenario is the first determination scenario, determining the gas leakage warning information of the at least one time point by comparing the gas concentration data of the at least one time point with the first warning slope threshold and the first warning concentration threshold.

5. The method of claim 1, wherein the determining a gas determination scenario through a preset determination algorithm based on the gas data includes:

in response to a determining that the gas data satisfies a second preset condition, determining the gas determination scenario as a second determination scenario.

6. The method of claim 5, wherein the gas data further includes gas scenario data, the gas scenario data includes gas spatial ventilation features, and the determining a dynamic threshold set based on the gas data and the gas determination scenario includes:

determining a second warning slope threshold and a second warning concentration threshold based on the gas spatial ventilation features; and in response to a determining that the gas determination scenario is the second determination scenario, determining the dynamic threshold set based on the second warning slope threshold and the second warning concentration threshold.

7. The method of claim 6, wherein the determining gas leakage warning information of the at least one time point based on the gas data, the gas determination scenario, and the dynamic threshold set includes:

in response to a determining that the gas determination scenario is the second determination scenario, determining the gas leakage warning information of the at least one time point by comparing the gas concentration data of the at least one time point with the second warning slope threshold and the second warning concentration threshold.

8. An IoT system for gas leakage warning, comprising a smart gas safety management platform configured to implement a method for gas leakage warning based on IoT of smart gas, wherein the smart gas safety management platform is configured to:

obtain gas data, the gas data at least including gas operation data and gas concentration data;

determine a gas determination scenario through a preset determination algorithm based on the gas data;

determine a dynamic threshold set based on the gas data and the gas determination scenario, wherein the dynamic threshold set includes a dynamic threshold of a gas concentration change of at least one time point; and determine gas leakage warning information of the at least one time point based on the gas data, the gas determination scenario, and the dynamic threshold set.

9. The IoT system of claim 8, wherein the IoT system further includes a smart gas user platform, a smart gas service platform, a smart gas indoor equipment sensor network platform, and a smart gas indoor equipment object platform, wherein the smart gas safety management platform includes a smart gas indoor safety management sub-platform and a smart gas data center;

the smart gas user platform includes a gas user sub-platform and a supervision user sub-platform;

the smart gas service platform includes a smart gas usage service sub-platform and a smart supervision service sub-platform;

the smart gas indoor equipment object platform is configured to obtain the gas data, and upload the gas data to the gas data center of the smart gas safety management platform through the smart gas indoor equipment sensor network platform;

the smart gas indoor safety management sub-platform is configured to determine the gas leakage warning information, and transmit the gas leakage warning information to the smart gas data center;

the smart gas data center is configured to transmit the gas leakage warning information to the smart gas service platform; and the smart gas service platform is configured to transmit the gas leakage warning information to the smart gas user platform.

10. A non-transitory computer-readable storage medium, comprising executable instructions that, when executed by a computer, direct the computer to perform a method for gas leakage warning based on IoT of smart gas of claim 1.

* * * * *